(12) United States Patent
Pyun et al.

(10) Patent No.: US 8,581,942 B2
(45) Date of Patent: Nov. 12, 2013

(54) BACKLIGHT UNIT FOR LIQUID CRYSTAL DISPLAY DEVICE AND DRIVING METHOD OF THE SAME

(75) Inventors: Ja-Young Pyun, Seoul (KR); Hyun-Ho Shin, Gyeonggi-do (KR); Kyu-Bong Jung, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 849 days.

(21) Appl. No.: 12/634,109

(22) Filed: Dec. 9, 2009

(65) Prior Publication Data

US 2010/0214331 A1   Aug. 26, 2010

(30) Foreign Application Priority Data

Feb. 26, 2009  (KR) .................. 10-2009-0016496

(51) Int. Cl.
*G09G 5/02* (2006.01)
(52) U.S. Cl.
USPC ........................................... 345/697
(58) Field of Classification Search
USPC ............... 345/697, 214; 349/65; 362/29, 606, 362/625, 559
See application file for complete search history.

(56) References Cited

U.S. PATENT DOCUMENTS

| | | | |
|---|---|---|---|
| 7,097,317 B2* | 8/2006 | Kim ................................ 362/29 |
| 7,507,012 B2* | 3/2009 | Aylward et al. ............... 362/625 |
| 7,661,862 B2* | 2/2010 | Lee et al. ...................... 362/559 |
| 8,089,582 B2* | 1/2012 | Sekiguchi et al. .............. 349/65 |
| 8,201,982 B2* | 6/2012 | Nagata et al. ................. 362/556 |
| 8,414,173 B2* | 4/2013 | Masuda et al. ................ 362/606 |
| 2010/0188601 A1* | 7/2010 | Onishi ............................ 349/61 |
| 2010/0214281 A1* | 8/2010 | Ueno et al. .................... 345/214 |

FOREIGN PATENT DOCUMENTS

| | | |
|---|---|---|
| CN | 101097054 | 1/2008 |
| CN | 101140335 | 3/2008 |
| CN | 101165515 | 4/2008 |
| TW | 200817726 A | 4/2008 |

OTHER PUBLICATIONS

TW Office Action issued Feb. 25, 2013.

* cited by examiner

*Primary Examiner* — Fred Tzeng
(74) *Attorney, Agent, or Firm* — Morgan, Lewis & Bockius LLP

(57) ABSTRACT

A backlight unit for a liquid crystal display device includes a reflection plate, a light guide plate over the reflection plate, the light guide plate having n grooves at a lower surface and including (n+1) areas divided by the grooves, wherein n is a natural number, a first LED assembly disposed at a first side surface of the light guide plate, the first LED assembly including (n+1) LED packages, each of which has at least one LED, wherein the LED packages of the first LED assembly correspond to the areas, respectively, and are separately driven, and a plurality of optical sheets over the light guide plate.

11 Claims, 7 Drawing Sheets

BACKLIGHT UNIT FOR LIQUID CRYSTAL DISPLAY DEVICE AND DRIVING METHOD OF THE SAME

This application claims the benefit of Korean Patent Application No. 10-2009-0016496 filed in Korea on Feb. 26, 2009, which is hereby incorporated by reference for all purposes as if fully set forth herein.

BACKGROUND OF THE DISCLOSURE

1. Field of the Invention

The disclosure relates to a liquid crystal display device, and more particularly to a backlight unit for a liquid crystal display device including light-emitting diodes and a driving method of the same.

2. Discussion of the Related Art

According to the rapid development in information technology, flat panel display (FPD) devices having thin thickness, light weight, and lower power consumption, such as liquid crystal display (LCD) devices, plasma display panels (PDPs), electroluminescent display (ELD) devices and field emission display (FED) devices, have been developed and have replaced cathode ray tubes (CRTs).

Among these devices, liquid crystal display (LCD) devices are most widely used for monitors of notebook computers, monitors of personal computers and televisions due to excellent moving images and high contrast ratio. By the way, the LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units are classified into an edge type and a direct type according to the position of a light source with respect to a display panel. In edge-type backlight units, one or a pair of lamps are disposed at one side or each of two sides of a light guide panel of a backlight unit. In direct-type backlight units, a plurality of lamps are disposed directly under a display panel.

FIG. 1 is a cross-sectional view of a liquid crystal display (LCD) device including a direct-type backlight unit according to the related art. In FIG. 1, a related art LCD device includes a liquid crystal panel 10, a backlight unit 20, a support main 30, a top cover 40 and a cover bottom 50. The liquid crystal panel 10 includes first and second substrates 12 and 14. The backlight unit 20 is disposed over a rear surface of the liquid crystal panel 10. The support main 30 of a rectangular frame shape surrounds side surfaces of the liquid crystal panel 10 and the backlight unit 20. The top cover 40 covers edges of a front surface of the liquid crystal panel 10, and the cover bottom 50 covers a rear surface of the backlight unit 20. The top cover 40 and the cover bottom 50 are combined with the support main 30 to thereby constitute one-united body.

The backlight unit 20 includes a reflection plate 22, a plurality of lamps 24, a diffuser plate 26, and a plurality of optical sheets 28. The plurality of lamps 24 are disposed over the reflection plate 22, and the diffuser plate 26 and the plurality of optical sheets 28 are sequentially disposed over the plurality of lamps 24.

A couple of side supports (not shown) are combined with the cover bottom 50 to fix and support the plurality of lamps 24. The lamps 24 may be cold cathode fluorescent lamps (CCFLs) or external electrode fluorescent lamps (EEFLs).

Recently, to display more vivid images, a method of driving the backlight unit 20 of the LCD device, in which the lamps 24 sequentially turn on/off, has been suggested, and the method may be referred to as a scanning driving method. According to this, the contrast ratio is improved by increasing the brightness of bright images or decreasing the brightness of dark images, and more vivid images are displayed.

In addition, the LCD devices have been generally used for desktop computer monitors and wall-mounted televisions as well as portable computer monitors, and LCD devices displaying vivid images and having a thin thickness have been widely researched.

Therefore, a method of reducing a distance A between the lamps 24 and the diffuser plate 26 of the backlight unit 20 has been suggested and developed to provide a thin LCD device.

However, to provide the liquid crystal panel with a high quality surface light source, various optical designs are considered. Among the designs, it is important to appropriately maintain the distance A between the lamps 24 and the diffuser plate 26. That is, when the distance A between the lamps 24 and the diffuser plate 26 is considerably short, light emanated from the lamps 24 has strong straightness, and the shapes of the lamps 24 are shown in a displayed image. Accordingly, lamp mura defects of a striped shape are caused. Thus, the image quality of the liquid crystal display device is lowered.

SUMMARY

Accordingly, the present invention is directed to a backlight unit for a liquid crystal display device and a driving method of the same that substantially obviate one or more of the problems due to limitations and disadvantages of the related art.

A backlight unit for a liquid crystal display device includes a reflection plate, a light guide plate over the reflection plate, the light guide plate having n grooves at a lower surface and including (n+1) areas divided by the grooves, wherein n is a natural number, a first LED assembly disposed at a first side surface of the light guide plate, the first LED assembly including (n+1) LED packages, each of which has at least one LED, wherein the LED packages of the first LED assembly correspond to the areas, respectively, and are separately driven, and a plurality of optical sheets over the light guide plate.

In another aspect, a driving method of a backlight unit for a liquid crystal display device, wherein the backlight unit includes a reflection plate; a light guide plate over the reflection plate, the light guide plate having n grooves at a lower surface and including (n+1) areas divided by the grooves, wherein n is a natural number; an LED assembly disposed at a first side surface of the light guide plate, the LED assembly including (n+1) LED packages, each of which has at least one LED, wherein the LED packages of the LED assembly correspond to the areas, respectively, and are separately driven; and a plurality of optical sheets over the light guide plate, includes steps of turning on a first LED package of the LED assembly to provide light to a first area of the light guide plate, and turning off the first LED package of the LED assembly and turning on a second LED package of the first LED assembly to provide light to a second area of the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
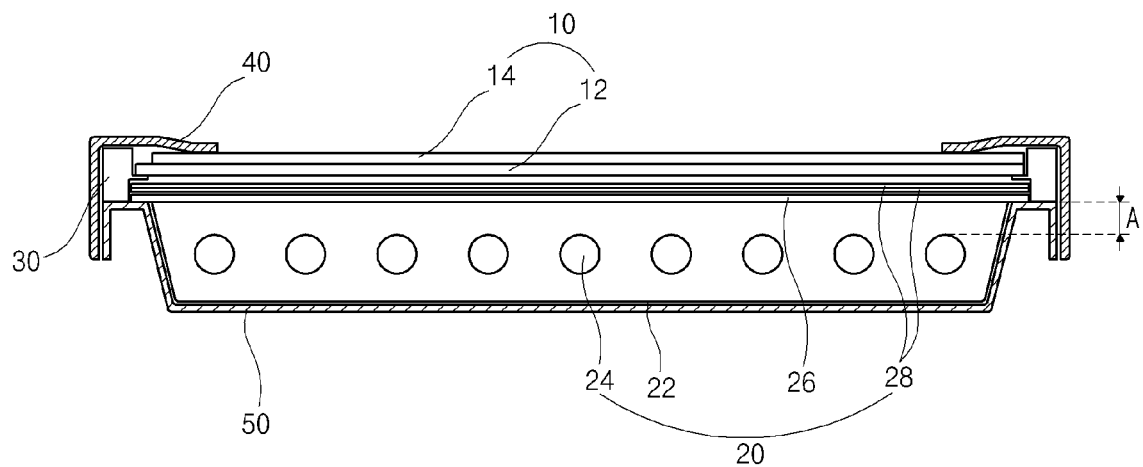
FIG. 1 is a cross-sectional view of a liquid crystal display (LCD) device including a direct-type backlight unit according to the related art.
Figure 2:
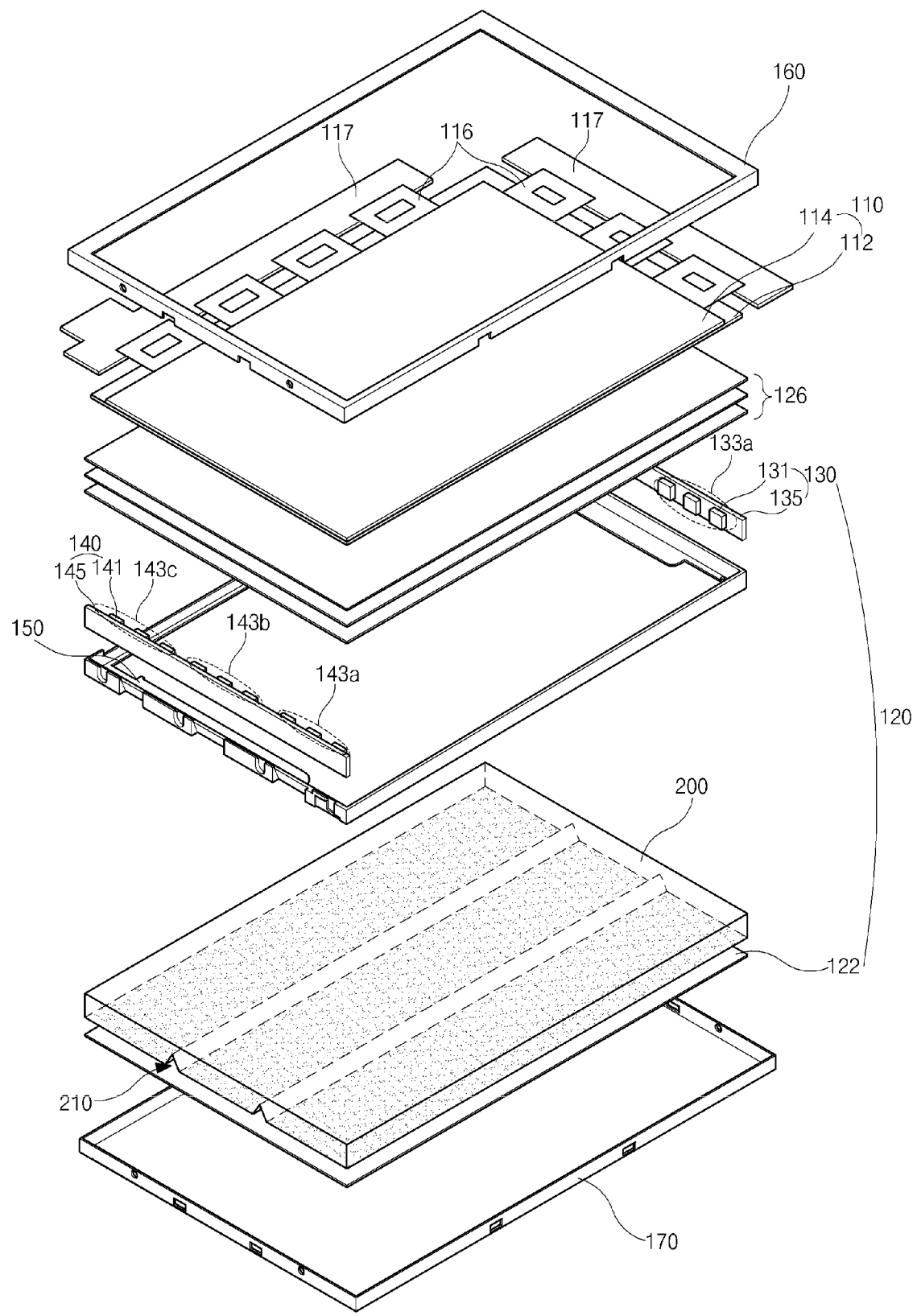
FIG. 2 is an exploded perspective view illustrating a liquid crystal display (LCD) device according to an exemplary embodiment of the present invention.

FIG. 2 is an exploded perspective view illustrating a liquid crystal display (LCD) device according to an exemplary embodiment of the present invention.

In FIG. 2, the LCD device according to the exemplary embodiment of the present invention includes a liquid crystal panel 110, a backlight unit 120, a support main 150, a top cover 160 and a cover bottom 170.

The liquid crystal panel 110 displays images. The liquid crystal panel 110 includes first and second substrates 112 and 114 facing and spaced apart from each other, and a liquid crystal layer (not shown) is interposed between the first and second substrates 112 and 114. The liquid crystal panel 110 may be an active matrix type, in which elements are arranged in a matrix shape. Although not shown in the figure, gate lines and data lines are formed on an inner surface of the first substrate 112, and the gate lines and the data lines cross each other to define pixel regions. A thin film transistor is formed at each crossing portion of the gate and data lines. A pixel electrode is connected to the thin film transistor and disposed in each pixel region.

Red, green and blue color filters (not shown) and a black matrix are formed on an inner surface of the second substrate 114, which may be referred to as a color filter substrate. The color filters correspond to the pixel regions. The black matrix surrounds each of the color filters and shields the gate lines, the data lines and the thin film transistors. A transparent common electrode (not shown) covers the color filters and the black matrix.

A printed circuit board 117 is attached to at least a side of the liquid crystal panel 110 via connecting means 116 such as flexible printed circuit boards, for example. The printed circuit board 117 is bent toward a side surface of the support main 150 or a rear surface of the cover bottom 170 during a modularizing process.

Although shown in the figure, upper and lower alignment layers are formed between the liquid crystal layer and the second substrate 114 and between the liquid crystal layer and the first substrate 112, respectively. The upper and lower alignment layers determine an initial direction of liquid crystal molecules. A seal pattern is formed along edge portions of the first and second substrates 112 and 114 to prevent the liquid crystal layer from leaking. A lower polarizer is disposed on an outer surface of the first substrate 112, and an upper polarizer is disposed on an outer surface of the second substrate 114.

The backlight unit 120 is disposed at a rear surface of the liquid crystal panel 110 and provides the liquid crystal panel 110 with light. The liquid crystal panel 110 changes transmittance of the light to display images.

Backlight units are classified into an edge type and a direct type according to the position of a light source with respect to a display panel. In edge-type backlight units, one or a pair of lamps are disposed at one side or each of two sides of a light guide plate of a backlight unit. In direct-type backlight units, a plurality of lamps are disposed directly under a display panel. To meet consumers' requests, LCD devices with a light weight and thin thickness have been developed, and the edge-type backlight units are more appropriate to thin and light LCD devices than the direct-type.

Additionally, backlight units include cold cathode fluorescent lamps (CCFLs), external electrode fluorescent lamps (EEFLs) or light-emitting diodes (LEDs) as a light source. Among these, LEDs have been widely used because of their compact sizes, lower power consumption and high reliability.

In the present invention, the backlight unit 120 is an edge type and includes LEDs as a light source.

The backlight unit 120 includes a reflection plate 122 of a white or silver color, a light guide plate 200 over the reflection plate 122, first and second LED assemblies 130 and 140 at opposite sides of the light guide plate 200, and optical sheets 126 over the light guide plate 200.

The first and second LED assemblies 130 and 140 are disposed at the opposite sides of the light guide plate 200 such that the first and second LED assemblies 130 and 140 faces respective side surfaces of the light guide plate 200, which lights from the first and second LED assemblies 130 and 140 are incident on and which are referred to as light-incident surfaces hereinafter. Each of the first and second LED assemblies 130 and 140 includes a flexible printed circuit board (FPCB) 135 or 145 and LEDs 131 or 141, which are spaced apart from each other and are mounted on the FPCB 135 or 145 along a length direction of the FPCB 135 or 145. Here, a metal printed circuit board (MCPCB) may be used in place of the FPCB 135 or 145 so that heats generated in the LEDs 131 or 141 are rapidly radiated.

In the present invention, the LEDs 131 and 141 of the first and second LED assembly 130 and 140 are sectioned into several packages along the length direction of the FPCBs 135 and 145. That is, the LEDs 131 of the first LED assembly 130 may be divided into a package 133a and other packages (not shown), for example, two more packages. The LEDs 141 of the second LED assembly 140 may be divided into three packages 143a, 143b and 143c. The LEDs 131 and 141 may be driven section by section.

To display more vivid images, the LEDs 131 and 141 may be driven by a scanning driving method, in which the LEDs 131 and 141 sequentially turn on/off.

More particularly, the LEDs 131 of the first LED assembly 130 may be sectioned into first to third LED packages, that is, an (1-1)st LED package 133a, an (1-2)nd LED package (not shown) and an (1-3)rd LED package (not shown). The LEDs 141 of the second LED assembly 140 may be sectioned into fourth to sixth LED packages, that is, a (2-1)st LED package 143a, a (2-2)nd LED package 143b, and a (2-3)rd LED package 143c. The LEDs 131 and 141 of the first and second LED assemblies 130 and 140 are driven section by section such that lights from the LED packages facing each other are incident on the opposite sides of the light guide plate 200.

The (1-1)st LED package 133a of the first LED assembly 130 and the (2-1)st LED package 143a of the second LED assembly 140 turn on at the same time, and lights from the (1-1)st LED package 133a and the (2-1)st LED package 143a are incident on the opposite sides of the light guide plate 200. Then, when the (1-1)st LED package 133a and the (2-1)st LED package 143a turn off, the (1-2)nd LED package (not shown) of the first LED assembly 130 and the (2-2)nd LED package 143b of the second LED assembly 140 turn on at the same time, and lights from the (1-2)nd LED package (not shown) and the (2-2)nd LED package 143b are incident on the opposite sides of the light guide plate 200.

Here, when the (1-1)st LED package 133a and the (2-1)st LED package 143a turn on and the lights are incident on the opposite sides of the light guide plate 200, the (1-2)nd LED package (not shown), the (1-3)rd LED package (not shown), the (2-2)nd LED package 143b and the (2-3)rd LED package 143c may turn off.

In the present invention, the LED packages 133a, 143a, 143b and 143c corresponding to the pixels turn off while pixels respond, and the LED packages 133a, 143a, 143b and 143c turn on after the pixels respond. Thus, the LED packages 133a, 143a, 143b and 143c turn on during a predetermined time of a frame and turn off during the rest time of the frame. The driving method may be referred to as a scanning block-division driving method.

Like this, by performing the scanning block-division driving method using the LED packages 133a, 143a, 143b and 143c, lights from the LED packages 133a, 143a, 143b or 143c in a selected section are provided to a predetermined area of the liquid crystal panel 110 through the light guide plate 200. Therefore, in the images displayed through the liquid crystal pane 110, the brightness of bright images is increased, and the brightness of dark images is decreased. Accordingly, the contrast ratio can be improved, and vivid images can be displayed.

In addition, the brightness of the lights can be adjusted according to images. Low brightness lights are supplied to images having dark data, and the power consumption of the backlight unit 120 can be decreased.

In the present invention, the light guide plate 200 includes grooves 210 across a lower surface of the light guide plate 200 from one light-incident surface to another light-incident surface. The grooves 210 divide the light-incident surfaces of the light guide plate 200 into several areas corresponding to the LED packages 133a, 143a, 143b and 143c. The grooves 210 prevent lights emanated from the LED packages 133a, 143a, 143b and 143c section by section and then being incident on the light guide plate 200 from being overlapped with each other in the light guide plate 200. This will be explained in more detail later.

The reflection plate 122 is disposed under a rear surface of the light guide plates 200. The reflection plate 122 reflects lights passing through the rear surface of the light guide plate 200 toward the liquid crystal panel 110 to increase the brightness.

The optical sheets 126 over the light guide plate 200 include a diffuser sheet and at least a light-concentrating sheet. The diffuser sheet disposed over the light guide plate 200 diffuses lights passing through the light guide plate 200 and controls the direction of the lights such that the lights go toward the light-concentrating sheet. The light-concentrating sheet concentrates the lights diffused by the diffuser sheet onto the direction of the liquid crystal panel 110. Accordingly, most lights passing through the light-concentrating sheet advance perpendicularly to the liquid panel 110.

Although not shown in the figure, a diffuser plate may be disposed between the light guide plate 200 and the diffuser sheet. The diffuser plate may have various haze properties depending on the desired light uniformity. Haze values of the diffuser plate may be determined by a light-diffusing means such as beads included in the diffuser plate or fine patterns formed at a lower surface of the diffuser plate without the beads. Here, the beads disperse lights incident on the diffusion plate and prevent lights from being partially concentrated. The diffusion plate without the beads controls scattering angles of lights according to shapes of the fine patterns. Therefore, lights are prevented from being locally concentrated.

The liquid crystal panel 110 and the backlight unit 120 are modularized with the top cover 160, the support main 150 and the cover bottom 170. The top cover 160 has a rectangular frame shape with an L-shaped cross-section to cover edges of a front surface and side surfaces of the liquid crystal panel 110. A front surface of the top cover 160 has an opening, wherein images of the liquid crystal panel 110 are displayed through the opening.

The cover bottom 170, which the liquid crystal panel 110 and the backlight unit 120 are disposed over and which is a base of the liquid crystal display module, has a rectangular plate shape. Four edges of the cover bottom 170 may be bent perpendicularly toward the liquid crystal panel 110. Thus, the cover bottom 170 may include a bottom wall and four side walls.

The support main 150 is disposed over the cover bottom 170. The support main 150 has a rectangular frame shape and surrounds edges of the liquid crystal panel 110 and the backlight unit 120. The support main 150 is combined with the top cover 160 and the cover bottom 170.

The top cover 160 may be referred to as a case top or a top case, the support main 150 may be referred to as a guide panel, a main support or a mold frame, and the cover bottom 170 may be referred to as a bottom cover.

Figure 3:
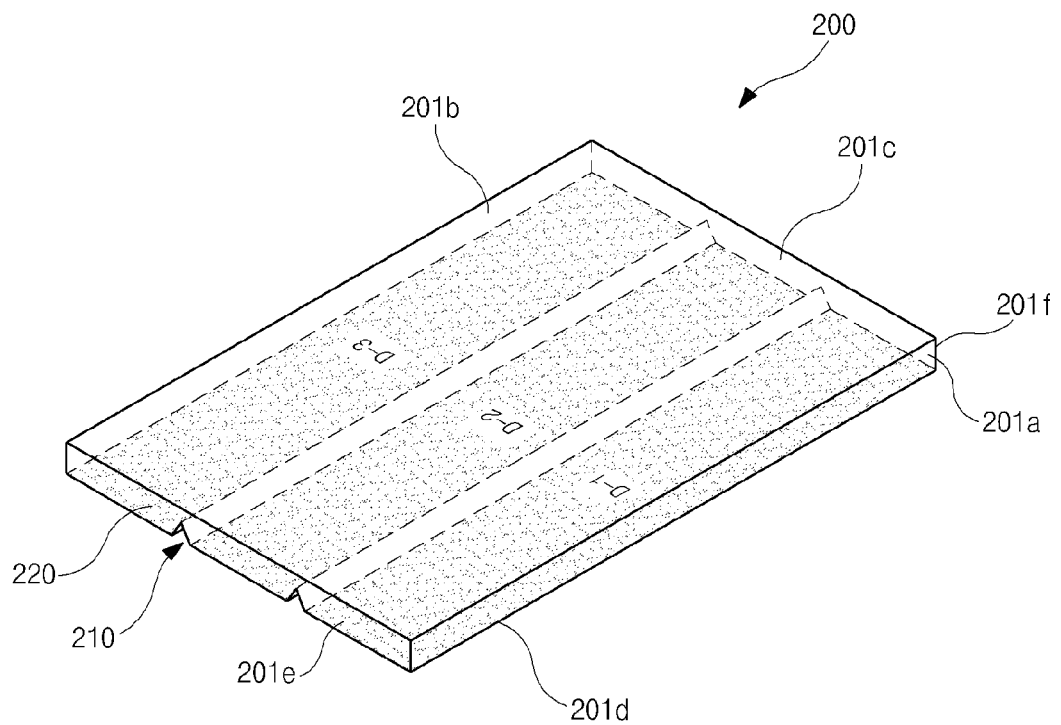
FIG. 3 is a perspective view of schematically illustrating a light guide plate according to an embodiment of the present invention.

FIG. 3 is a perspective view of schematically illustrating a light guide plate according to an embodiment of the present invention.

In FIG. 3, the light guide plate 200 may be formed of a transparent resin material that transmits light, for example, a plastic material, such as polymethylmethacrylate (PMMA), or polycarbonate material. The light guide plate 200 may have a flat plate shape. Here, PMMA, as an acrylic resin, has properties of superior light transmission, high resistance to weathering and easy tinting and causes diffusion of light when the light passes therethrough.

The light guide plate 200 includes a first side surface 201e corresponding to the first LED assembly 130 of FIG. 2, that is, a first light-incident surface, a second side surface 201f corresponding to the second LED assembly 140 of FIG. 2, that is, a second light-incident surface, an upper surface 201c connecting the first and second light-incident surfaces 201e and 201f and sending lights therethrough, a lower surface 201d facing the reflection plate 122, and opposite third and fourth side surfaces 201a and 201b facing each other.

The light guide plate 200 includes grooves 210 at the lower surface 201d such that lights, which are emanated from the LED packages 133a, 143a, 143b and 143c of FIG. 2 section by section and are incident on the light guide plate 200, are not overlapped with each other. The grooves 210 have a V-shaped cross-section such that an angular point faces the upper surface 201c of the light guide plate 200. The grooves 210 go across the lower surface 201d of the light guide plate 200 from the first light-incident surface 201e to the second light-incident surface 201f. It is desirable that the grooves 210 have a height, which may be a distance from the angular point to the lower surface 201d and may be referred to as a depth, smaller than ⅔ of a thickness of the light guide plate 200.

The light guide plate 200 is divided into areas D-1, D-2 and D-3 due to the grooves 210. The areas D-1, D-2 and D-3 correspond to the LED packages 133a, 143a, 143b and 143c of the first and second LED assemblies 130 and 140 of FIG. 2 in respective sections.

For example, the LEDs 131 of FIG. 2 of the first LED assembly 130 of FIG. 2 are divided into the (1-1)st LED package 133a, the (1-2)nd LED package (not shown) and the (1-3)rd LED package (not shown). The LEDs 141 of FIG. 2 of the second LED assembly 140 of FIG. 2 are divided into the (2-1)st LED package 143a, the (2-2)nd LED package 143b and the (2-3)rd LED package 143c. The light guide plate 200 is divided into first, second and third areas D-1, D-2 and D-3.

When the (1-1)st LED package 133a of the first LED assembly 130 of FIG. 2 and the (2-1)st LED package 143a of the second LED assembly 140 of FIG. 2 turn on simultaneously and emit lights toward side surfaces of the light guide plate 200, the lights from the (1-1)st LED package 133a and the (2-1)st LED package 143a go into the first area D-1 of the light guide plate 200.

Next, when the (1-1)st LED package 133a of the first LED assembly 130 of FIG. 2 and the (2-1)st LED package 143a of the second LED assembly 140 of FIG. 2 turn off, and the (1-2)nd LED package (not shown) of the first LED assembly 130 of FIG. 2 and the (2-2)nd LED package 143b of the second LED assembly 140 of FIG. 2 turn on simultaneously and emit lights toward side surfaces of the light guide plate 200, the lights from the (1-2)nd LED package (not shown) and the (2-2)nd LED package 143b go into the second area D-2 of the light guide plate 200 and are not overlapped with the lights incident on the first area D-1 of the light guide plate 200.

Meanwhile, fine patterns 220 having predetermined shapes are formed at the lower surface 201d of the light guide plate 200, which is divided into the areas D-1, D-2 and D-3, so that the lights incident on the inside of the light guide plate 200 through the light-incident surfaces 201e and 201f are guided toward the liquid crystal panel 110 of FIG. 2. The patterns 220 may be elliptical patterns, polygonal patterns or hologram patterns. The patterns 220 may be formed by a printing method or an injecting method.

In the present invention, the lights emanated from the LED packages 133a, 143a, 143b and 143c of FIG. 2 section by section are selectively provided to a predetermined portion of the liquid crystal panel 110 through the light guide plate 200 by performing the scanning block-division driving method using the LED packages 133a, 143a, 143b and 143c of FIG. 2.

Accordingly, the brightness of the bright images is increased, and the brightness of the dark images is decreased. Therefore, the contrast ratio can be improved, and vivid images can be displayed.

Specially, the lights emanated from each of the LED packages 133a, 143a, 143b and 143c of FIG. 2 and being incident on the inside of the light guide plate 200 are not overlapped with each other, and more vivid image can be displayed.

Figure 4A:
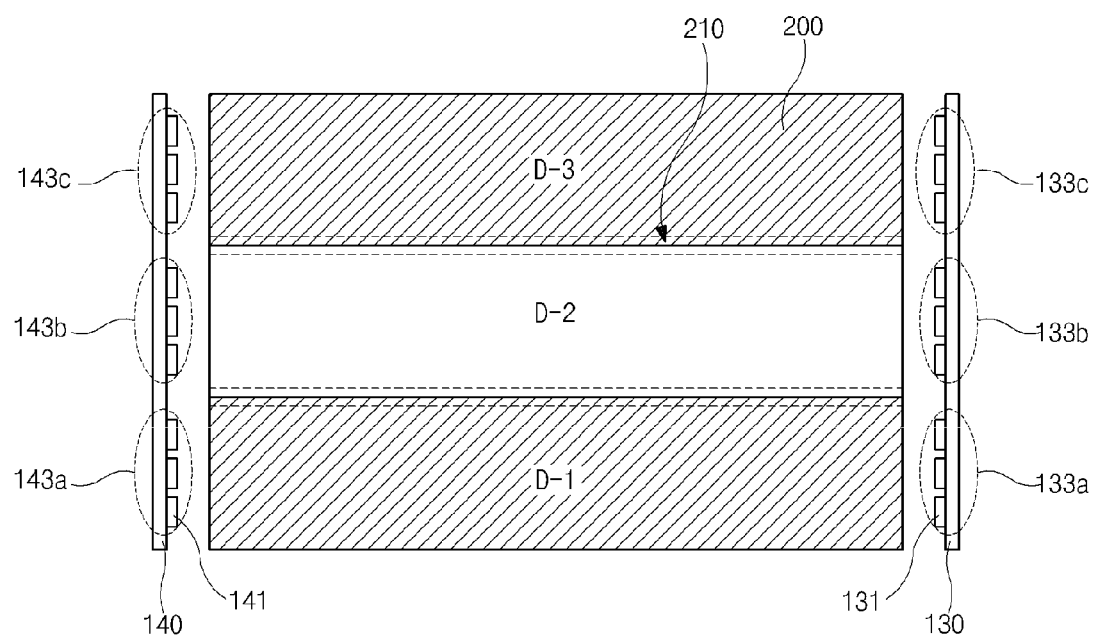
FIGS. 4A and 4B are views for explaining a scanning block-division driving method according to an embodiment of the present invention.
Figure 4B:
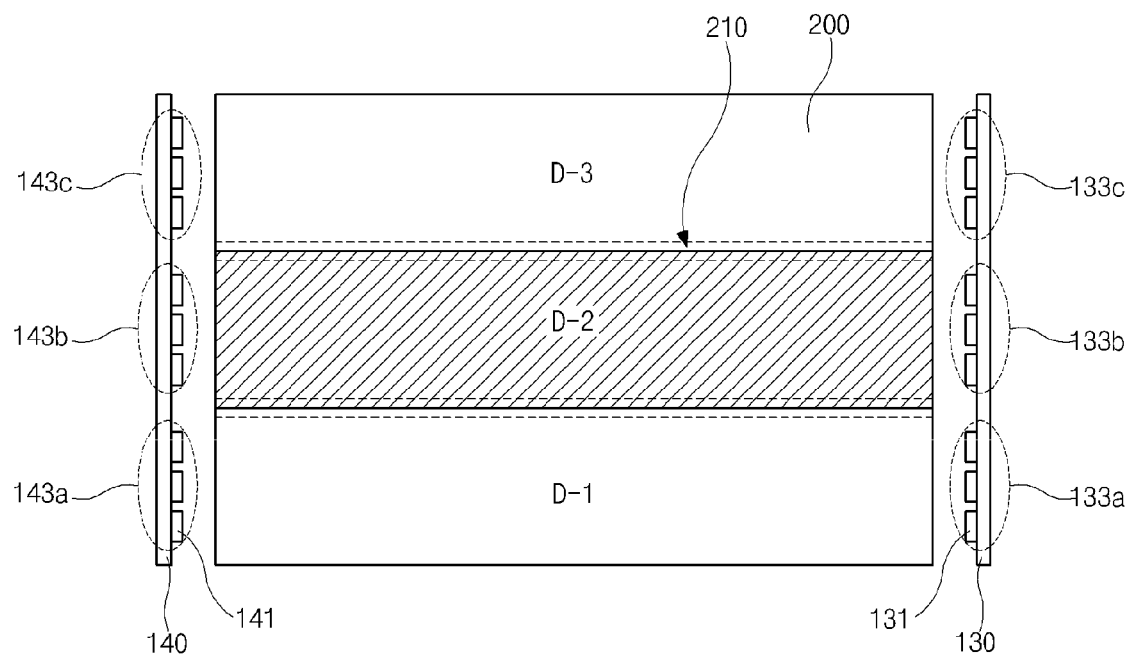

FIGS. 4A and 4B are views for explaining a scanning block-division driving method according to an embodiment of the present invention.

In FIGS. 4A and 4B, the light guide plate 200 is divided into the first, second and third areas D-1, D-2 and D-3 due to the grooves 210 at the lower surface 201d of FIG. 3. The first and second LED assemblies 130 and 140 including the LEDs 131 and 141 are disposed at and face the light-incident surfaces 201a and 201b of FIG. 3 of the light guide plate 200.

The LEDs 131 of the first LED assembly 130 are divided into three LED packages, and the LEDs 141 of the second LED assembly 140 are divided into three LED packages. More particularly, the LEDs 131 of the first LED assembly 130 are divided into the (1-1)st LED package 133a, the (1-2)nd LED package 133b and the (1-3)rd LED package 133c. The LEDs 141 of the second LED assembly 140 are divided into the (2-1)st LED package 143a, the (2-2)nd LED package 143b and the (2-3)rd LED package 143c. The LED packages 133a, 133b, 133c, 143a, 143b and 143c are driven section by section facing each other and emit lights toward the light guide plate 200.

Therefore, in the present invention, by performing the scanning block-division driving method, the brightness of the bright images is increased, and the brightness of the dark images is decreased. Thus, the contrast ratio can be improved, and vivid images can be displayed.

Namely, as shown in FIG. 4A, to increase the brightness of an image of the liquid crystal panel 110 of FIG. 2 corresponding to the first and third areas D-1 and D-3 of the light guide plate, the (1-1)st LED package 133a and the (1-3)rd LED package 133c of the first LED assembly 130 and the (2-1)st LED package 143a and the (2-3)rd LED package 143c of the second LED assembly 140 turn on at the same time and emit lights toward the first and third areas D-1 and D-3 of the light guide plate 200. At this time, the (1-2)nd LED package 133b and the (2-2)nd LED package 143b of the first and second LED assemblies 130 and 140 turn off, and there is no light incident on the second area D-2 of the light guide plate 200.

According to this, the image of the liquid crystal panel 110 of FIG. 2 corresponding to the first and third areas D-1 and D-3 of the light guide plate 200 is displayed to get brighter, and the image of the liquid crystal panel 110 of FIG. 2 corresponding to the second area D-2 of the light guide plate 200 is displayed to be dark as compared with the image of liquid crystal panel 110 of FIG. 2 corresponding to the first and third areas D-1 and D-3. Therefore, the contrast ratio can be improved.

Alternatively, as shown in FIG. 4B, the (1-2)nd LED package 133b of the (2-2)nd LED package 143b of the first and second LED assemblies 130 and 140 turn on and emit lights toward the second area D-2 of the light guide plate 200. The image of the liquid crystal panel 110 of FIG. 2 corresponding to the second area D-2 of the light guide plate 200 is displayed to be brighter, and the image of the liquid crystal panel 110 of FIG. 2 corresponding to the first and third areas D-1 and D-3 of the light guide plate 200 is displayed to be dark as compared with the image of the liquid crystal panel 110 of FIG. 2 corresponding to the second area D-2 of the light guide plate 200. Accordingly, the contrast ratio can be improved.

Therefore, vivid images can be displayed.

Particularly, the lights incident on the light guide plate 200 from the LED packages 133a, 133b, 133c, 143a, 143b and 143c section by section are not overlapped and mixed with each other in the light guide plate 200, and more vivid images can be displayed.

Figure 5A:
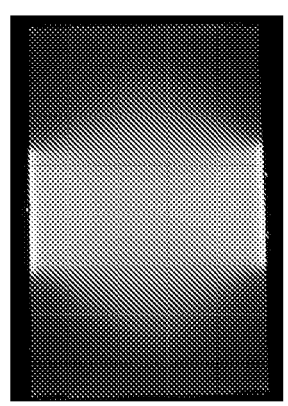
FIGS. 5A and 5B are views of showing backlight units driven by a scanning block-division driving method according to the present invention.
Figure 5B:
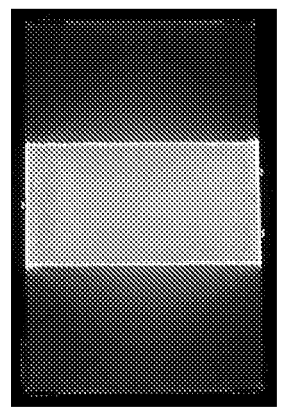

FIGS. 5A and 5B are views of showing backlight units driven by a scanning block-division driving method according to the present invention. The backlight unit of FIG. 5A includes a light guide plate without grooves, and the backlight unit of FIG. 5B includes a light guide plate with grooves. Here, FIGS. 5A and 5B show the backlight units when the (1-2)nd LED package 133b and the (2-2)nd LED package 143b of the first and second LED assemblies 130 and 140 turn on and emit lights toward the second area D-2 of the light guide plate 200.

As shown in FIG. 5A, in the backlight unit including a light guide plate 200 without grooves, lights incident on the second area D-2 of the light guide plate 200 are spread into the first and third areas D-1 and D-3 of the light guide plate 200. Accordingly, it is not possible to increase the brightness of only the image corresponding to the second area D-2 of the light guide plate 200, and vivid images can not be displayed.

On the other hand, as shown in FIG. 5B, when the grooves 210 are formed at the lower surface 201d of FIG. 3 of the light guide plate 200 such that the light guide plate 200 is divided into several areas, the lights incident on the second area D-2 of the light guide plate 200 are not spread into the first and third areas D-1 and D-3 of the light guide plate 200. Therefore, it is possible to increase the brightness of only the bright image corresponding to the second area D-2 of the light guide plate 200 and to decrease the brightness of the dark image, and the contrast ratio can be improved. Thus, vivid images can be displayed.

Figure 6A:
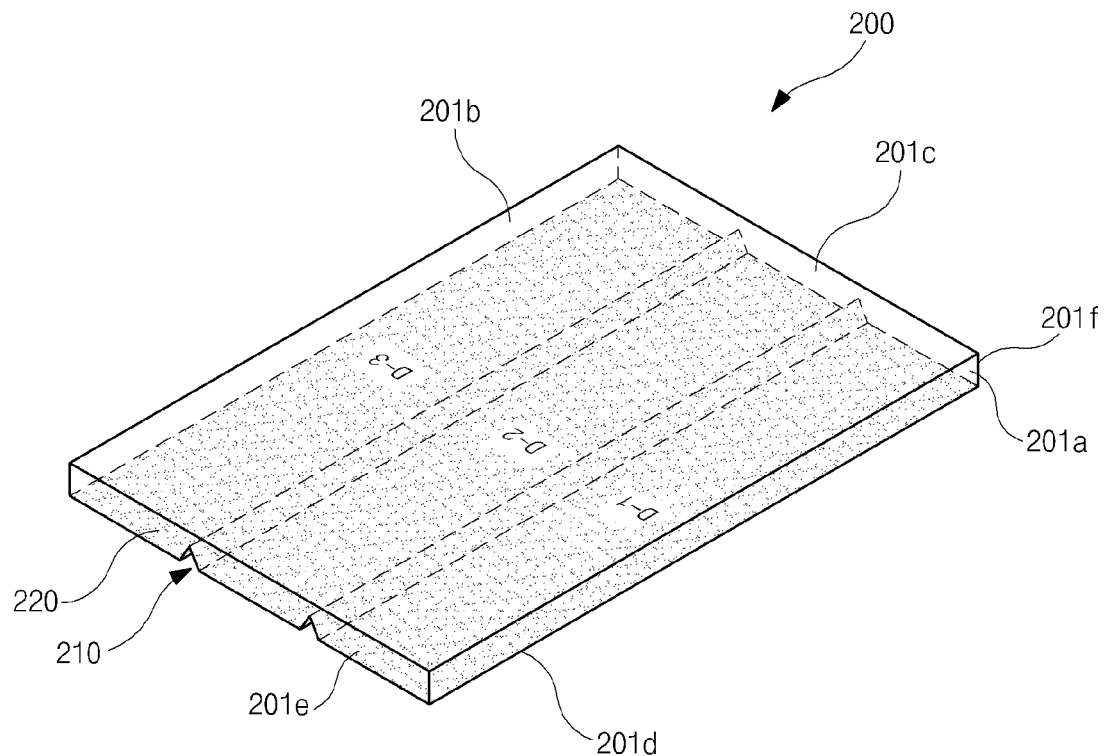
FIGS. 6A to 6C are perspective views of illustrating light guide plates according to other embodiments of the present invention.
Figure 6B:
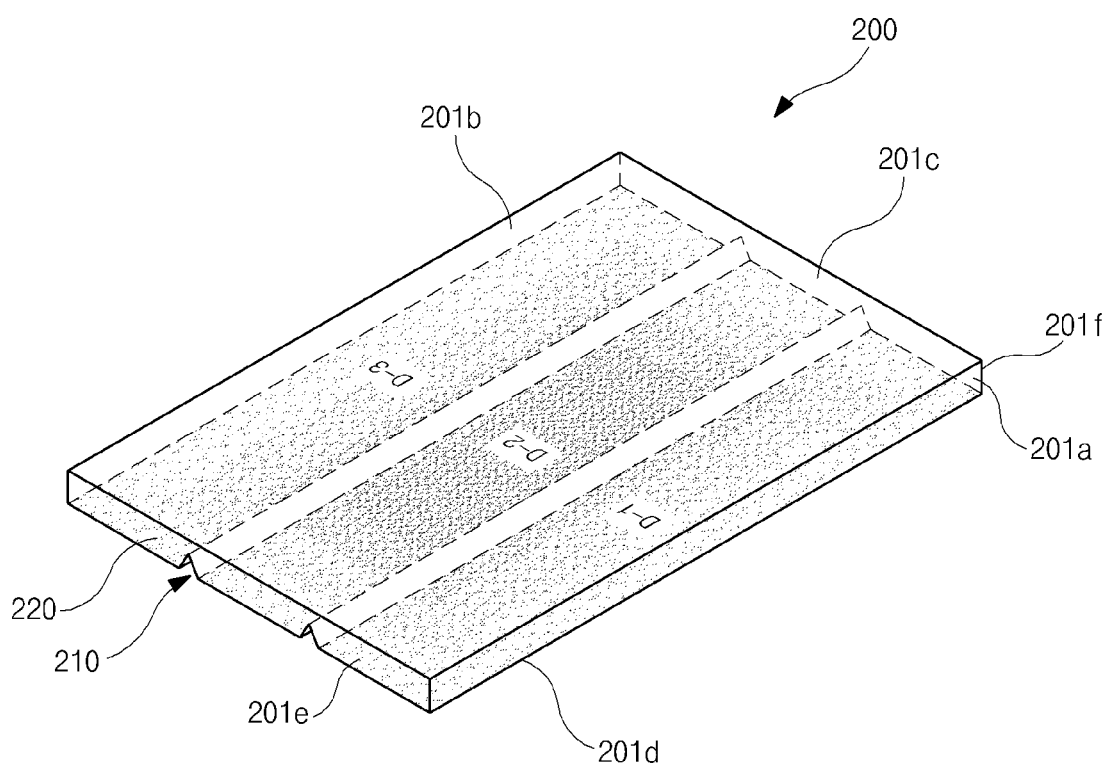
Figure 6C:
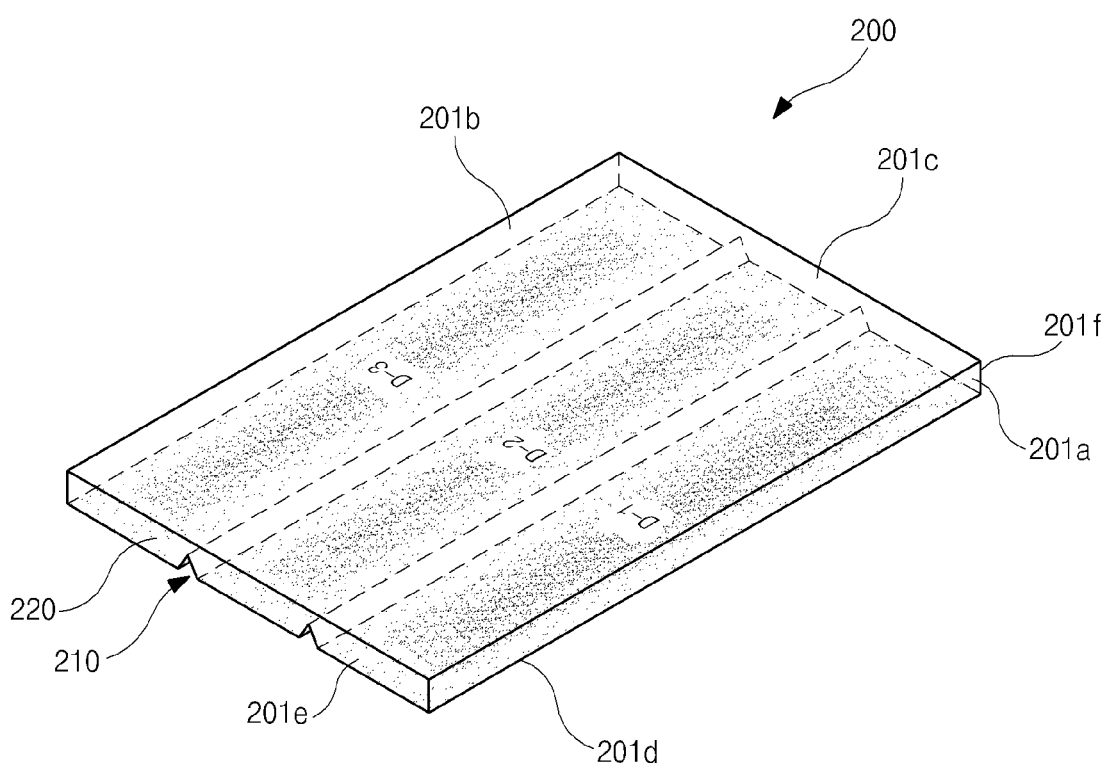

FIGS. 6A to 6C are perspective views of illustrating light guide plates according to other embodiments of the present invention.

In FIGS. 6A to 6C, the light guide plate 200 may be formed of a transparent resin material that transmits light, for example, a plastic material, such as polymethylmethacrylate (PMMA), or polycarbonate material. The light guide plate 200 may have a flat plate shape. Here, PMMA, as an acrylic resin, has properties of superior light transmission, high resistance to weathering and easy tinting and causes diffusion of light when the light passes therethrough.

The light guide plate 200 includes a first light-incident surface 201e corresponding to the first LED assembly 130 of FIG. 4A, a second light-incident surface 201f corresponding to the second LED assembly 140 of FIG. 4A, an upper surface 201c connecting the first and second light-incident surfaces 201e and 201f and sending lights therethrough, a lower surface 201d facing the reflection plate 122 of FIG. 2, and opposite side surfaces 201a and 201b facing each other.

The light guide plate 200 includes grooves 210 at the lower surface 201d such that the light guide plate 200 is divided into areas and lights, which are emanated from the LED packages 133a, 133b, 133c, 143a, 143b and 143c of FIG. 4A section by section and are incident on the light guide plate 200, are not overlapped with each other. The grooves 210 have a V-shaped cross-section such that an angular point faces the upper surface 201c of the light guide plate 200. The grooves 210 go across the lower surface 201d of the light guide plate 200 from the first light-incident surface 201e to the second light-incident surface 201f. It is desirable that the grooves 210 have a height, which may be a distance from the angular point to the lower surface 201d and may be referred to as a depth, smaller than two thirds of a thickness of the light guide plate 200.

The light guide plate 200 is divided into first, second and third areas D-1, D-2 and D-3 due to the grooves 210. The first, second and third areas D-1, D-2 and D-3 correspond to the LED packages 133a, 133b, 133c, 143a, 143b and 143c of the first and second LED assemblies 130 and 140 of FIG. 4A in respective sections.

In addition, patterns 220 having predetermined shapes are formed at the lower surface 201d of the light guide plate 200, which is divided into the first, second and third areas D-1, D-2 and D-3, so that the lights incident on the inside of the light guide plate 200 through the light-incident surfaces 201e and 201f are guided toward the liquid crystal panel 110 of FIG. 2. The patterns 220 may be elliptical patterns, polygonal patterns or hologram patterns. The patterns 220 may be formed by a printing method or an injecting method.

As shown in FIG. 6A, the patterns 220 may be formed at the entire lower surface 201d of the light guide plate 200 including the grooves 210 to control reflection paths of the lights incident on the light guide plate 200 and improve the uniformity of the brightness. That is, the patterns 220 may be formed at the surfaces of the grooves 210.

As shown in FIG. 6B, the patterns 220 may be formed to have low density per unit area according as it approaches the LED assemblies 130 and 140 of FIG. 4A and high density per unit area according as it is far from the first and second LED assemblies 130 and 140 of FIG. 4A. Namely, the patterns 220 may have high density according as it approaches a central portion of the light guide plate 200 regardless of the first, second and third areas D-1, D-2 and D-3 of the light guide plate 200.

As shown in FIG. 6C, the patterns 220 may be formed in each of the first, second and third areas D-1, D-2 and D-3 at the lower surface 201d of the light guide plate 200 and may have high density according as it approaches a central portion in each of the first, second and third areas D-1, D-2 and D-3.

In FIGS. 6B and 6C, the patterns 220 may not be formed at the surfaces of the grooves 210.

As stated above, the LCD device of the present invention includes an edge-type backlight unit, which is light and thin, and the backlight unit is driven by the scanning block-division driving method. Accordingly, the brightness of the bright images is increased, and the brightness of the dark images is decreased. The contrast ratio can be improved. Therefore, vivid image can be displayed.

Especially, when the backlight unit is driven by the scanning block-division driving method using the LED packages 133a, 133b, 133c, 143a, 143b and 143c of FIG. 4B, the lights, which are emanated from the LED packages 133a, 133b, 133c, 143a, 143b and 143c section by section and are incident on the inside of the light guide plate 200, are not spread and mixed with each other in the light guide plate 200. Accordingly, more vivid images can be displayed.

In addition, the brightness of the lights can be adjusted according to images. Low brightness lights are supplied to images having dark data, and the power consumption of the backlight unit 120 can be decreased.

Moreover, the lamp mura defects can be prevented, and an LCD device having uniform brightness and improved image qualities can be provided.

In the embodiment of the present invention, the light guide plate is divided into three areas. The number of areas of the light guide plate may be varied.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
   a reflection plate;
   a light guide plate over the reflection plate, the light guide plate having n grooves at a lower surface of the light guide plate and including (n+1) areas divided by the grooves, wherein n is a natural number;
   a first LED assembly disposed at a first side surface of the light guide plate, the first LED assembly including (n+1) LED packages, each of which has at least one LED, wherein the LED packages of the first LED assembly correspond to the (n+1) areas, respectively, and are separately driven; and a plurality of optical sheets over the light guide plate, wherein the light guide plate includes patterns at the lower surface, and wherein the patterns have high density according as it approaches a central portion of the light guide plate or according as it approaches a central portion in each of the areas of the light guide plate.

2. The backlight unit according to claim 1, wherein the grooves have a V-shaped cross-section such that an angular point faces an upper surface of the light guide plate opposite to the lower surface.

3. The backlight unit according to claim 1, further comprising a second LED assembly disposed at a second side surface of the light guide plate opposite to the first side surface, the second LED assembly including (n+1) LED packages, each of which has at least one LED, wherein the LED packages of the second LED assembly correspond to the areas, respectively, and are separately driven.

4. The backlight unit according to claim 1, wherein the first LED assembly further includes a printed circuit board on which the LED packages are mounted.

5. The backlight unit according to claim 4, wherein the printed circuit board includes one of a flexible printed circuit board and a metal printed circuit board.

6. The backlight unit according to claim 1, wherein the patterns are formed at surfaces of the grooves.

7. The backlight unit according to claim 1, wherein the patterns have one selected from an elliptical pattern, a polygonal pattern, a hologram pattern and a prism pattern.

8. The backlight unit according to claim 1, wherein the plurality of optical sheets include a diffuser sheet and a light-concentrating sheet.

9. The backlight unit according to claim 1, wherein light emanated from a first LED package of the first LED assembly is provided to a first area of the light guide plate when the first LED package of the first LED assembly turns on, and then light emanated from a second LED package of the first LED assembly is provided to a second area of the light guide plate when the first LED package of the first LED assembly turns off and the second LED package of the first LED assembly turns on.

10. A driving method of a backlight unit for a liquid crystal display device, wherein the backlight unit includes a reflection plate; a light guide plate over the reflection plate, the light guide plate having n grooves at a lower surface of the light guide plate and including (n+1) areas divided by the grooves, wherein n is a natural number; an LED assembly disposed at a first side surface of the light guide plate, the LED assembly including (n+1) LED packages, each of which has at least one LED, wherein the LED packages of the LED assembly correspond to the (n+1) areas, respectively, and are separately driven; and a plurality of optical sheets over the light guide plate, the method comprising:

turning on a first LED package of the LED assembly to provide light to a first area of the light guide plate; and turning off the first LED package of the LED assembly and turning on a second LED package of the first LED assembly to provide light to a second area of the light guide plate, wherein the light guide plate includes patterns at the lower surface, and wherein the patterns have high density according as it approaches a central portion of the light guide plate or according as it approaches a central portion in each of the areas of the light guide plate.

11. The method according to claim 10, wherein the light provided to the first area is not mixed with the light provided to the second area due to the grooves.

* * * * *